United States Patent
Watanabe et al.

(10) Patent No.: US 9,065,942 B2
(45) Date of Patent: Jun. 23, 2015

(54) DISPLAY PROCESSING APPARATUS

(75) Inventors: Toshinari Watanabe, Nagoya (JP); Masaaki Wakizaka, Ichinomiya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 583 days.

(21) Appl. No.: 12/729,032

(22) Filed: Mar. 22, 2010

(65) Prior Publication Data
US 2010/0277427 A1 Nov. 4, 2010

(30) Foreign Application Priority Data
Apr. 30, 2009 (JP) .................................. 2009-111592

(51) Int. Cl.
*G06F 3/041* (2006.01)
*H04N 1/00* (2006.01)
*G06F 3/0481* (2013.01)
*G06F 3/0484* (2013.01)

(52) U.S. Cl.
CPC .......... *H04N 1/0035* (2013.01); *G06F 3/04817* (2013.01); *G06F 3/04845* (2013.01); *G06F 3/0418* (2013.01); *H04N 1/00411* (2013.01)

(58) Field of Classification Search
CPC . G06F 3/048; G06F 3/04817; G06F 3/04845; G06F 3/0418; G06F 2200/1614; H04N 1/0035; H04N 1/00411

USPC ......................................................... 345/173
See application file for complete search history.

(56) References Cited

U.S. PATENT DOCUMENTS

| | | | | |
|---|---|---|---|---|
| 2006/0031786 A1* | 2/2006 | Hillis et al. | .................... | 715/863 |
| 2008/0259048 A1 | 10/2008 | Touyamasaki | | |
| 2009/0046075 A1* | 2/2009 | Kim et al. | ..................... | 345/173 |

FOREIGN PATENT DOCUMENTS

| | | | |
|---|---|---|---|
| JP | 2007-101825 A | 4/2007 | |
| JP | 2008-292731 A | 12/2008 | |

\* cited by examiner

*Primary Examiner* — Jonathan Boyd
(74) *Attorney, Agent, or Firm* — Baker Botts L.L.P.

(57) ABSTRACT

A display processing apparatus includes a display, a display control unit, and a detection unit configured to determine an inputted position of the display. The display processing apparatus includes a processing performing unit configured to determine a selected designator and to perform the processing indicated by the selected designator. The display processing apparatus further includes a judging unit configured to judge whether or not the inputted position determined by the detection unit is included in a direction selecting portion of the display. When the judging unit judges that the inputted position determined by the detection unit is included in the direction selecting range of the display, the display control unit changes a display direction of the designator in such a way that the designator orients the direction selecting portion which is judged to include the inputted position.

11 Claims, 4 Drawing Sheets

Fig. 1A
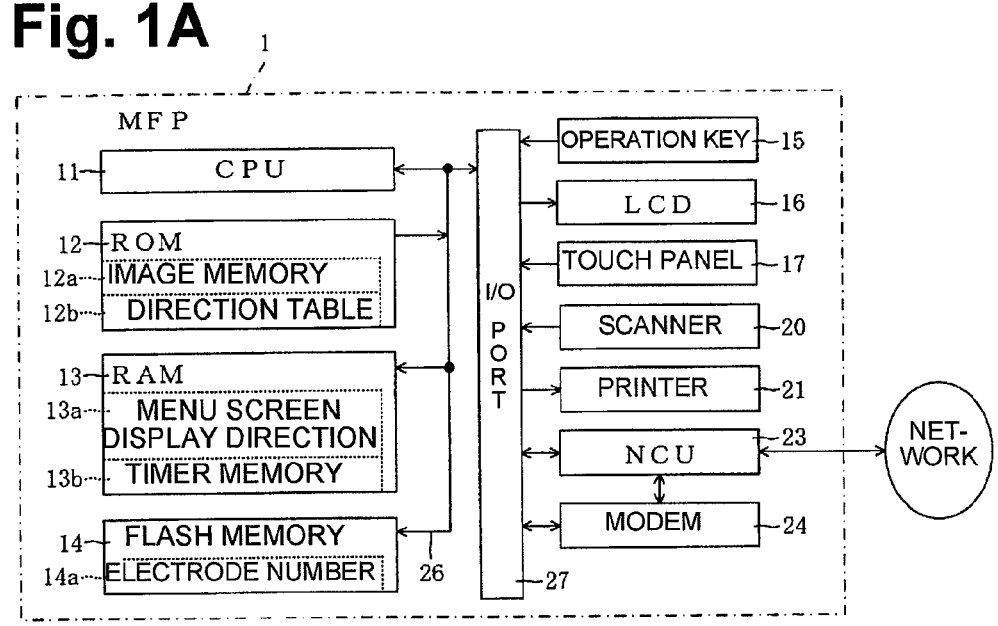
Fig. 1B
| | EDGE | ARROW | COPY | PRINTER | FAX | T BOOK | L CHANGE | OTHERS |
|---|---|---|---|---|---|---|---|---|
| 16a | UP | UP KEY | (x1, y1) | ... | ... | ... | ... | ... |
| 16b | DOWN | D KEY | (x2, y2) | ... | ... | ... | ... | ... |
| 16c | LEFT | L KEY | (x3, y3) | ... | ... | ... | ... | ... |
| 16d | RIGHT | R KEY | (x4, y4) | ... | ... | ... | ... | ... |
Fig. 1C
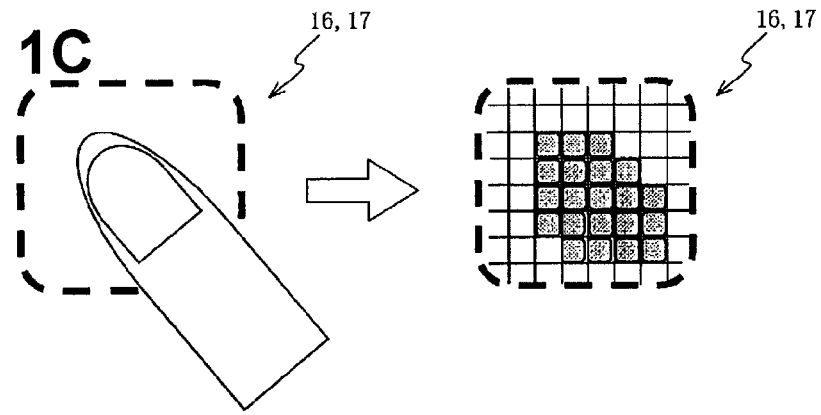

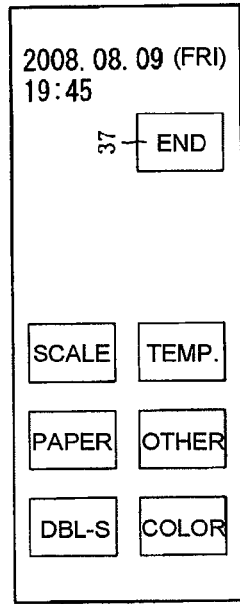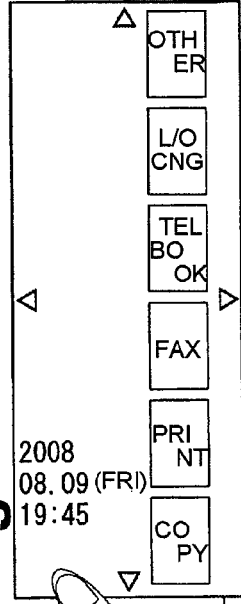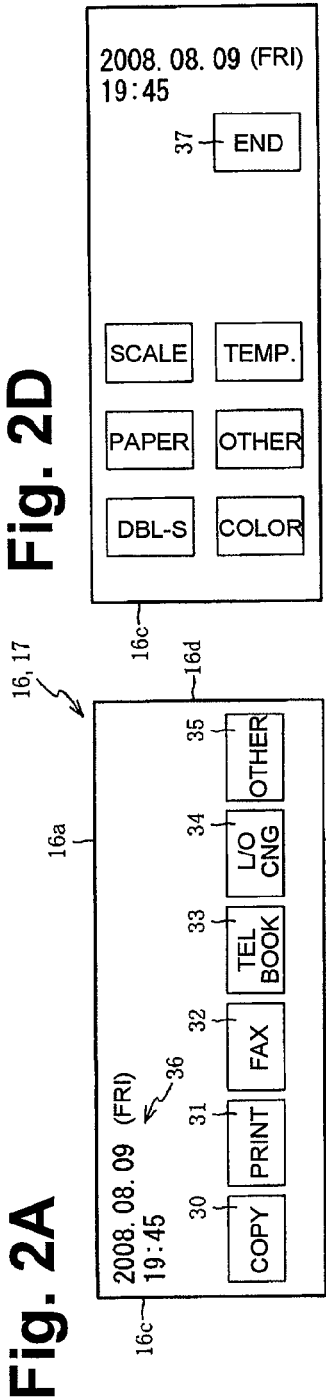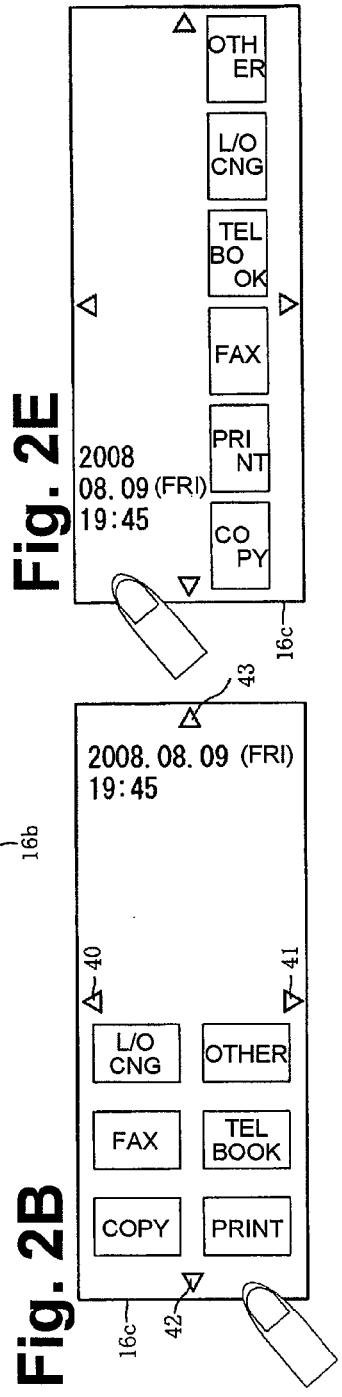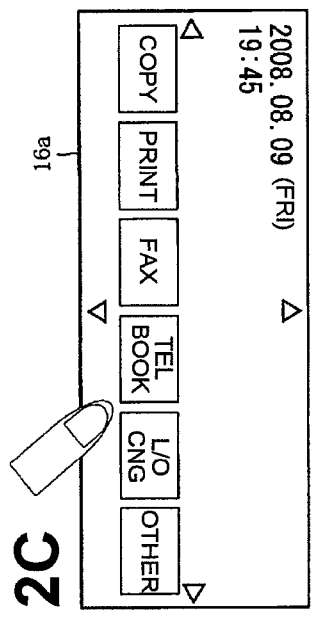

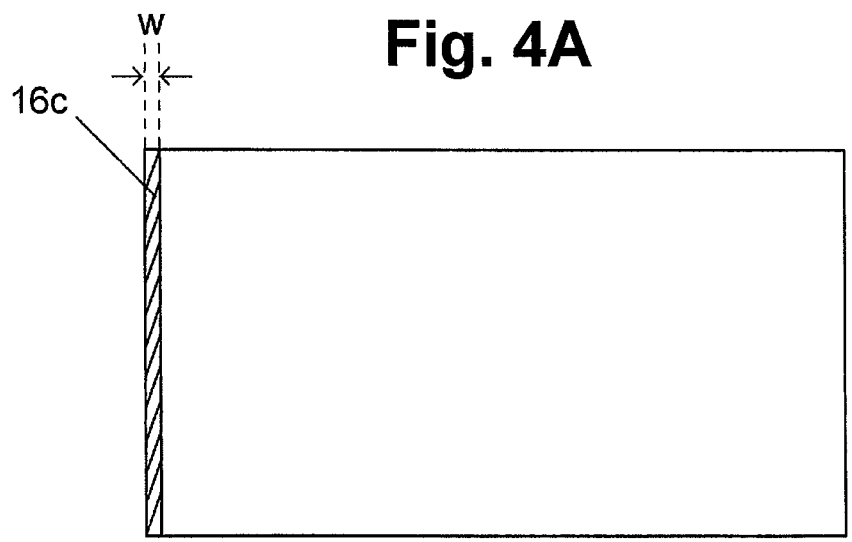
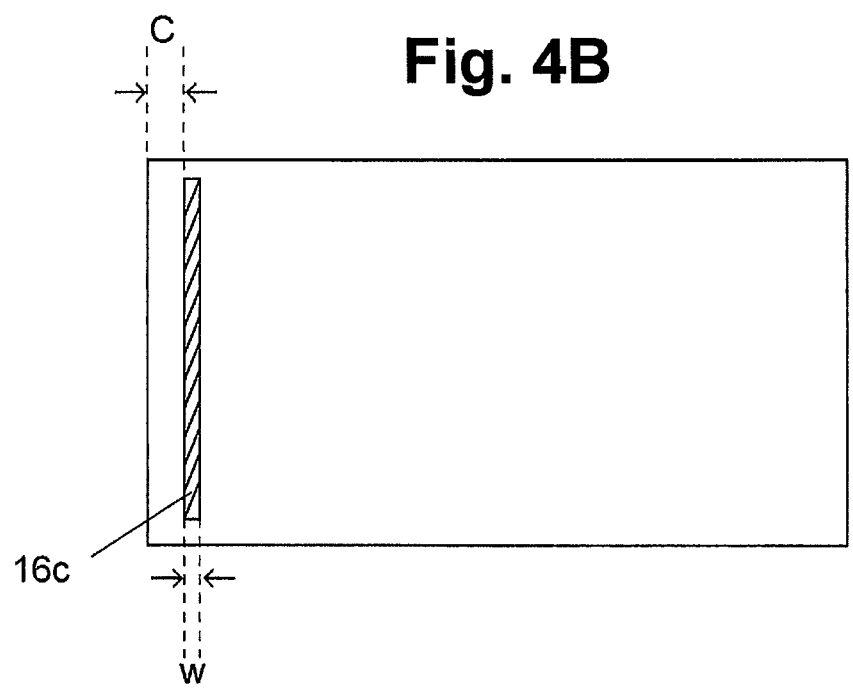

DISPLAY PROCESSING APPARATUS

CROSS REFERENCE TO RELATED APPLICATION

The present application claims priority from Japanese Patent Application No. 2009-111592, filed on Apr. 30, 2009, the disclosure of which is incorporated herein by reference in its entirely.

BACKGROUND

1. Technical Field

The present invention relates to a display processing apparatus including a display.

2. Related Art

It is known that a processing apparatus including a touch panel mounted on an LCD display. The processing apparatus changes a display direction of display image to be displayed on the LCD display according to a condition that a finger or a stylus pen is moved on the touch panel in any one of four directions while bringing the finger or the stylus pen into contact with the touch panel.

SUMMARY

However, to change the display direction of the display image to be displayed on the LCD display, it is necessary to move the finger or the stylus pen on the touch panel in a desired direction while bringing the finger or the stylus pen into contact with the touch panel. A path for changing the display direction of the display image has to be reserved in a display area of the display.

As a result, when the LCD display is configured that a designator to be displayed as an image is displayed on the LCD display and, as a result of the designator being touched, processing assigned to the designator is performed, the problem is that a range in which the designator can be positioned is restricted to prevent false detection.

A need has arisen to provide a processing apparatus that can display a designator in a convenient direction which is suitable for the user to recognize the designator while reducing restrictions of a range in which the designator, which is to be displayed as an image, can be positioned.

According to an embodiment of the present invention, a display processing apparatus comprises a display configured to display a designator to be displayed as an image, and configured such that, when an object approaches close to or contacts with an arbitrary position of the display, the arbitrary position of the display occurs an electrical change. The display processing apparatus further comprises a display control unit configured to perform controlling the display to display the designator, and comprises a detection unit configured to determine an inputted position of the display by detecting an electrical change of the arbitrary position of the display. The display processing apparatus still further comprises a first memory which stores an image of the designator, a display position of the designator, and processing indicated by the designator in relation to one another. Moreover, the display processing apparatus comprises a processing performing unit configured to determine a selected designator based on whether a range of the designator stored in the first memory and displayed on the display includes or not the inputted position of the display determined by the detection unit. The processing performing unit is configured to perform the processing indicated by the selected designator. The display processing apparatus further comprises a judging unit configured to judge whether or not the inputted position determined by the detection unit is included in a direction selecting portion of the display. When the judging unit judges that the inputted position determined by the detection unit is included in the direction selecting range of the display, the display control unit changes a display direction of the designator in such a way that the designator orients the direction selecting portion which is judged to include the inputted position.

BRIEF DESCRIPTION OF THE DRAWINGS

For a more complete understanding of the present invention, the needs satisfied thereby, and the features and advantages thereof, reference now is made to the following descriptions taken in connection with the accompanying drawings wherein:

FIG. 1A is a block diagram showing an electrical configuration of an MFP;

FIG. 1B is a diagram showing a display direction table for a menu screen;

FIG. 1C is a diagram for explaining the reference electrode number K;

FIGS. 2A to 2E are diagrams showing the screens displayed on an LCD;

FIGS. 4A and 4B are diagrams showing the examples of the edge portion.

DESCRIPTION OF THE PREFERRED EMBODIMENTS

Figure 3:
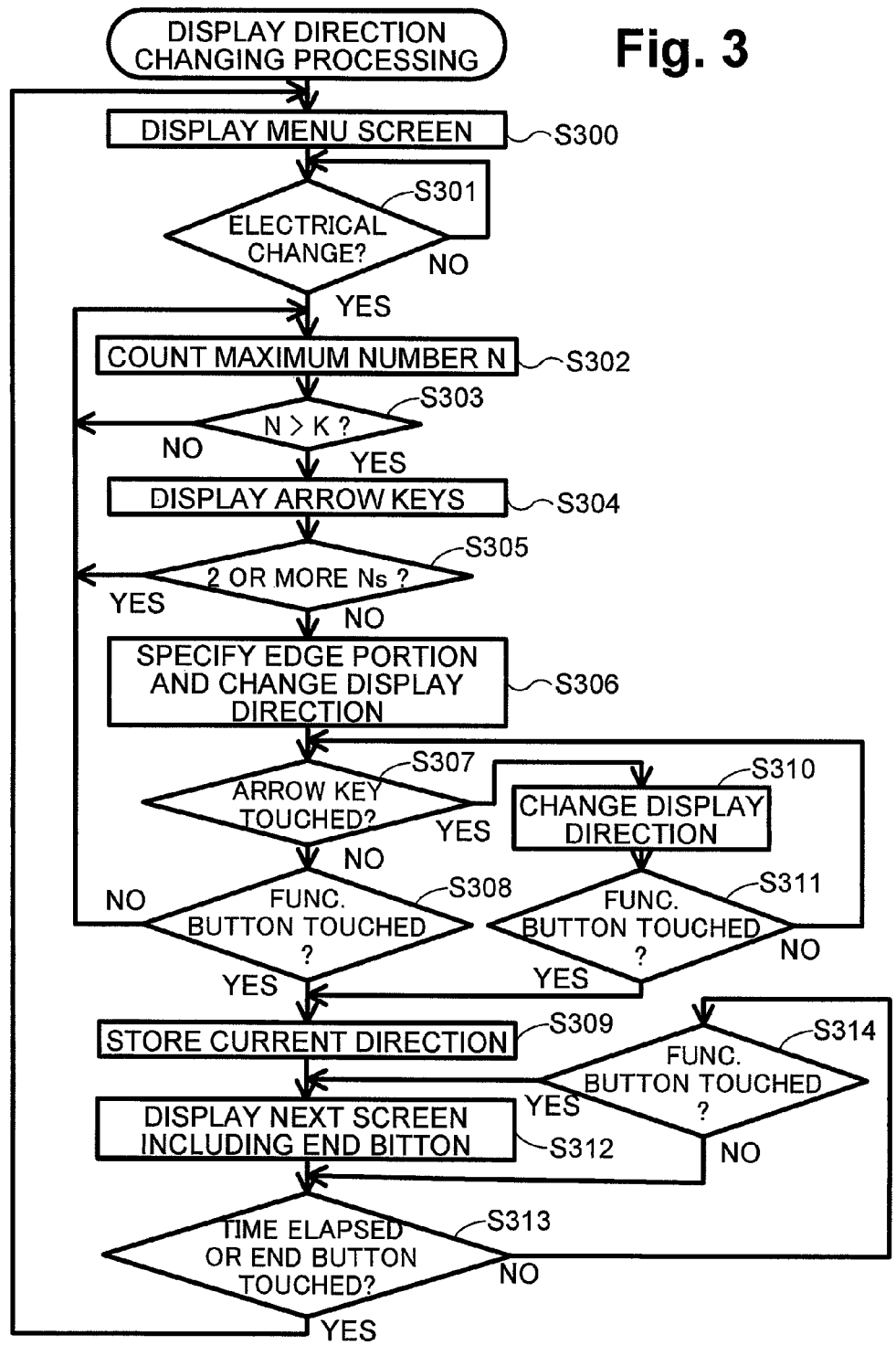
FIG. 3 is a flow chart showing display direction change processing.

Embodiments of the invention and their features and advantages may be understood by referring to FIGS. 1A-3, like numerals being used for like corresponding parts in the various drawings. In the description given below, an entire configuration of a color printer as an example of an image forming apparatus in brief first, and then characteristic portions of the embodiment of the invention will be described in detail.

In Hereinafter, an embodiment of the invention will be described with reference to the accompanying drawings. FIG. 1A is a block diagram showing an electrical configuration of a multifunctional peripheral, hereinafter referred to as an "MFP (Multi Function Peripheral)" 1 which is an example of a display processing apparatus.

The MFP 1 includes a CPU 11, a ROM 12, a RAM 13, a flash memory 14, an operation key 15, an LCD 16 (an example of a display), a touch panel 17 (an example of a detection unit), a scanner 20, a printer 21, an NCU (Network Control Unit) 23, and a modem 24. Incidentally, the CPU 11, the ROM 12, the RAM 13, and the flash memory 14 are connected to each other via a bus line 26. Moreover, the bus line 26, the operation key 15, the LCD 16, the touch panel 17, the scanner 20, the printer 21, the NCU 23, and the modem 24 are connected to each other via an input/output port 27.

As described above, the MFP 1 has multiple functions including a copy function realized by the scanner 20 and the printer 21, a printer function realized by the printer 21, a facsimile function realized by the scanner 20, the printer 21, the NCU 23, and the modem 24, and a telephone function realized by the NCU 23 and the modem 24.

Moreover, a housing of the MFP 1 is formed in a virtually box shape, and the operation key 15, the LCD 16, and the touch panel 17 are disposed on a top face of the housing. In addition, the MFP 1 of this embodiment can, in particular, display a designator to be displayed on the LCD 16 as an image in a direction which is readily recognized to the user without restricting the display position of the designator.

The operation key 15 is a push-button key, and is provided with a start/enter key and a numeric keypad, for example. When the operation key 15 is operated by the user, processing corresponding to the operation key 15 is performed. The LCD 16 displays various types of images, and displays a menu screen shown in FIG. 2A, for example. Moreover, in a display area of the LCD 16, the touch panel 17 is disposed.

The touch panel 17 is a sensor for detecting whether an object such as a finger of the user approaches closer to or contacts with (hereinafter referred to as "touch") the display area of the LCD 16. An electrode pattern partitioning the display area of the LCD 16 like a grid is disposed, and the touch panel 17 detects whether an object such as a finger of the user has touched the display area of the LCD 16 by detecting an electrical change caused by a change in capacitance produced between the electrode pattern and the object such as the finger of the user. Not only when the object such as the finger of the user contacts with the display area of the LCD 16, the touch panel 17 can detect the electrical change, but also when the object such as the finger of the user is close to (near but without contact) the display area of the LCD 16, the touch panel 17 can also detect the electrical change by enhancing the sensitivity of the sensor.

The CPU 11 controls the functions of the MFP 1 and controls individual parts connected to the input/output port 27 according to a fixed value or a program stored in the ROM 12, the RAM 13, or the flash memory 14 or various types of signals transmitted and received via the NCU 23.

The ROM 12 is a memory which is not rewritable and stores a control program or the like to be executed by the MFP 1, and a program performing display direction change processing shown in a flow chart of FIG. 3 is stored in the ROM 12.

Moreover, the ROM 12 is provided with an image memory 12a (an example of a first memory) and a display direction table memory 12b (an example of a second memory). In the image memory 12a, an icon (an example of a designator) to be displayed on the LCD 16 as an image, the display position of the icon, and processing assigned to the icon are stored in relation to one another. Furthermore, in the display direction table memory 12b, a display direction table for a menu screen, the display direction table shown in FIG. 1B, for example, is stored. Incidentally, in the display direction table memory 12b, in addition to the display direction table described above, a display direction table is stored for each screen.

The RAM 13 is a rewritable volatile memory for temporarily storing various types of data at the time of execution of each operation of the MFP 1, and is provided with a menu screen display direction memory 13a and a timer memory 13b. In the menu screen display direction memory 13a, the display direction of a function button included in the menu screen when the menu screen is switched to the next screen is stored. In the timer memory 13b, the time elapsed since the menu screen was switched to the next screen is stored.

The flash memory 14 is a rewritable nonvolatile memory, and data stored in the flash memory 14 is held even after the MFP 1 is turned off. The flash memory 14 is provided with a reference electrode number memory 14a. In the reference electrode number memory 14a, the number of electrodes touched by the object such as the finger when the user normally operates the touch panel 17 is stored as the reference electrode number K.

FIG. 1C is a diagram for explaining the reference electrode number K. The reference electrode number K is stored in the reference electrode number memory 14a. The reference electrode number K is a threshold value that indicates that a determination that the object such as the finger of the user touches the touch panel 17 can be made. When the user touches the touch panel 17 as when the user normally operates the touch panel 17 (for example when the finger of the user crosses the edge portion of the touch panel 17 and enters the touch panel 17), the total number of electrodes touched by the finger is counted by the CPU 11. When K (K>0) electrodes are touched, it is considered that the object such as the finger of the user has touched the touch panel 17. Since a judgment as to whether the user performs operation by which the object such as the finger of the user crosses an edge portion of the LCD 16 (an edge portion of the touch panel 17) or not is made based on the reference electrode number K, it is possible to improve the precision of judgment. There are various reasons causing the wrong judgment by the CPU that the electrodes are touched. A suitable value of K can effectively avoid the wrong judgment. The value of K can be set by the user according to actual situation.

FIGS. 2A to 2E are diagrams showing the screens displayed on the LCD 16. FIG. 2A is a diagram showing a menu screen (an initial screen) displayed on the LCD 16. As shown in FIG. 2A, on the menu screen, from the left in a lower portion, function buttons (examples of designators) including a copy button 30, a printer button 31, a FAX button 32, a telephone book button 33, a layout change button 34, and an "other" button 35, which are to be displayed as an image, are displayed, and, in an upper left portion, date and time information 36 is displayed. Incidentally, the function buttons 30 to 35 are displayed in their respective display positions according to the display positions stored in the image memory 12a.

The display area of the LCD 16 (the detection area of the touch panel 17) is formed in a rectangular shape, and an edge portion of the display area is divided into four portions, an upper edge portion 16a, a lower edge portion 16b, a left edge portion 16c, and a right edge portion 16d. For each of the above portions, the display positions of the function buttons 30 to 35 are stored in the display direction table for a menu screen, the display direction table shown in FIG. 1B. For example, as shown in FIG. 1B, the display position (x3, y3) of the copy button 30 in the display area is stored in relation to the left edge portion 16c.

FIG. 2B is a diagram showing a menu screen displayed on the LCD 16 when the finger of the user crosses the left edge portion 16c of the LCD 16 and enters the LCD 16 in the state shown in FIG. 2A.

In this case, first, the position of the object such as the finger of the user is detected via the touch panel 17, and the left edge portion 16c including the detected position is specified. Then, the function buttons 30 to 35 are displayed in the display positions stored in the display direction table shown in FIG. 1B in relation to the left edge portion 16c in such a way that the function buttons 30 to 35 orient the left edge portion 16c.

That is, when the object such as the finger is detected in the left edge portion 16c, there is a high possibility that the user is present on that side of the LCD 16 where the left edge portion 16c is located. Therefore, in such a case, the menu screen is displayed orienting the left edge portion 16c, whereby it becomes possible to display the menu screen in a direction which is readily recognized to the user who is present on that side of the LCD 16 where the left edge portion 16c is located.

Moreover, on the menu screen displayed in a direction shown in FIG. 2B, four arrow keys 40 to 43, an up key 40, a down key 41, a left key 42, and a right key 43, are displayed. The arrow keys 40 to 43 are keys for designating the display direction of the function buttons 30 to 35. Processing for changing the direction of the function buttons 30 to 35 so that the function buttons 30 to 35 orient upward, processing for changing the direction of the function buttons 30 to 35 so that the function buttons 30 to 35 orient downward, processing for changing the direction of the function buttons 30 to 35 so that the function buttons 30 to 35 orient to the left, and processing for changing the direction of the function buttons 30 to 35 so that the function buttons 30 to 35 orient to the right are assigned to the up key 40, the down key 41, the left key 42, and the right key 43, respectively.

Therefore, for example, in the state shown in FIG. 2B, when the up key 40 is touched, the menu screen including the function buttons 30 to 35 is displayed as shown in FIG. 2C. Specifically, the up key 40 is specified via the touch panel 17, and the function buttons 30 to 35 are displayed in the display positions stored in the display direction table shown in FIG. 1B in relation to the up key 40 in such a way that the function buttons 30 to 35 orient upward, which is assigned to the up key 40 thus specified. This makes it possible to display the menu screen in a desired direction of the user.

FIG. 2C is a diagram showing the menu screen displayed on the LCD 16 when the finger of the user crosses the upper edge portion 16a of the LCD 16 and enters the LCD 16 in the state shown in FIG. 2A.

Also in this case, as has been described in FIG. 2B, first, the position of the object such as the finger is detected via the touch panel 17, and the upper edge portion 16a including the position is specified. Then, the function buttons 30 to 35 are displayed in the display positions stored in the display direction table shown in FIG. 1B in relation to the upper edge portion 16a in such a way that the function buttons 30 to 35 orient the upper edge portion 16a.

That is, when the finger is detected in the upper edge portion 16a, there is a high possibility that the user is present on that side of the LCD 16 where the upper edge portion 16a is located. Therefore, in such a case, the menu screen is displayed so as to orient the upper edge portion 16a, whereby it is possible to display the menu screen in a direction which is easily visible to the user who is present on that side of the LCD 16 where the upper edge portion 16a is located.

Moreover, though not illustrated, when the object such as the finger of the user crosses the right edge portion 16d of the LCD 16 and enters the LCD 16, the function buttons 30 to 35 are displayed in such a way that the function buttons 30 to 35 orient the right edge portion 16d. Incidentally, when the finger of the user crosses the lower edge portion 16b of the LCD 16 and enters the LCD 16, a display state shown in FIG. 1A is maintained.

FIG. 2D is a diagram showing the next screen displayed next to the menu screen when the copy button 30 is touched by the user in the state shown in FIG. 2B. When it is detected via the touch panel 17 that the copy button 30 has been touched, the display direction of the function buttons 30 to 35 (the state in which the buttons orient to the left) shown in FIG. 2B is stored in the menu screen display direction memory 13a.

Then, when the next screen is displayed, the function buttons, "Scaling factor", "Density", "Paper", "Other", "Two-sided", "Color", and "End 37" included in the next screen are displayed in the same direction as that of the function buttons 30 to 35 shown in FIG. 2B (in the state in which the buttons orient to the left) according to the direction stored in the menu screen display direction memory 13a.

That is, in the display direction table memory 12b, in addition to the display direction table for a menu screen, the display direction table shown in FIG. 1B, a display direction table for the next screen is prepared. When the next screen is displayed, the function buttons ("Scaling factor", "Density", "Paper", "Other", "Two-sided", "Color", and "End 37") included in the next screen are displayed in the display positions stored in the display direction table for the next screen in relation to the state in which the buttons orient to the left in such a way that the function buttons included in the next screen orient to the left. As a result, the user can see the next screen in the same direction as that of the function buttons 30 to 35 included in the menu screen without performing any operation.

FIG. 3 is a flow chart showing display direction change processing. This processing is performed for changing the display direction of a screen to be displayed on the LCD 16. In this processing, first, a menu screen (an initial screen) shown in FIG. 2A is displayed on the LCD 16 (S300), and the electrode capacitance of an edge portion of the LCD 16 is monitored for changes (S301).

As a result, if no change is observed (S301: No), the electrode capacitance is continuously monitored (S301). If a change is observed (S301: Yes), the maximum number N of electrodes which have changed consecutively is counted (S302). Then, it is judged whether or not the maximum electrode number N is equal to or greater than the reference electrode number K (S303). If the maximum electrode number N is smaller than the reference electrode number K (S303: No), the procedure goes back to the processing in S302. When the maximum electrode number N becomes equal to or greater than the reference electrode number K (S303: Yes), the arrow keys 40 to 43 shown in FIGS. 2B and 2C are displayed on the LCD 16 (S304).

Then, it is judged whether or not the maximum electrode number N is detected at two or more portions of the display (S305). For example, it is judged whether or not maximum electrode number N1 at a first portion of the display and maximum electrode number N2 at a second portion of the display are detected. If two or more portions of the display is detected the maximum electrode number (S305: Yes), it is judged that there is an operating error, and the processing is repeated from S302 again. On the other hand, if two or more portions of the display is not detected the maximum electrode number, that is, if the number is one (S305: No), by specifying the position of the maximum electrode number N in the upper edge portion 16a, the lower edge portion 16b, the left edge portion 16c, or the right edge portion 16d of the edge portions of the rectangular LCD 16, the function buttons 30 to 35 are displayed in the display positions stored in the display direction table (see FIG. 1B) in relation to the specified portion in such a way that the function buttons 30 to 35 included in the menu screen orient the specified portion (S306).

As a result, since the menu screen is displayed so as to orient the edge portion (a direction selecting portion) including the position in which the object such as the finger has been detected, it is possible to display the menu screen in a direction which is readily recognized to the user who is present on that side where the edge portion (a direction selecting portion) including the position in which the object such as the finger has been detected is located.

Thereafter, it is judged whether or not any one of the arrow keys 40 to 43 displayed in S304 has been touched (S307). If none of the arrow keys 40 to 43 has been touched (S307: No), it is judged whether or not any one of the function buttons 30 to 35 has been touched (S308). If none of the function buttons 30 to 35 has also been touched (S308: No), the procedure goes back to the processing in S302; if any one of the function buttons 30 to 35 has been touched (S308: Yes), the procedure proceeds to processing in S309.

On the other hand, if it is judged in S307 that any one of the arrow keys 40 to 43 has been touched (S307: Yes), by specifying which of the arrow keys 40 to 43, the up key 40, the down key 41, the left key 42, and the right key 43, has been touched, the function buttons 30 to 35 are displayed in the display positions stored in the display direction table (see FIG. 1B) in relation to the specified arrow key of the arrow keys 40 to 43 in such a way that the function buttons 30 to 35 included in the menu screen orient in the direction to which the specified arrow key of the arrow keys 40 to 43 is assigned (S310). This makes it possible to display the menu screen in a desired direction of the user.

Then, it is judged whether or not any one of the function buttons 30 to 35 has been touched (S311). If none of the function buttons 30 to 35 has been touched (S311: No), the procedure goes back to the processing in S307; if any one of the function buttons 30 to 35 has been touched (S311: Yes), the procedure proceeds to the processing in S309.

If it is judged in the processing in S308 or S311 that any one of the function buttons 30 to 35 has been touched, the current display direction of the function buttons 30 to 35 is stored in the menu screen display direction memory 13a (S309), and the next screen is displayed in such a way that the function buttons (including an end button) included in the next screen orient in the direction stored in S309 (S312).

For example, when any one of the function buttons 30 to 35 is touched in the state shown in FIG. 2B, the state in which the buttons orient to the left is stored, and the next screen is displayed in the state in which the buttons orient to the left as shown in FIG. 2D. Likewise, when any one of the function buttons 30 to 35 is touched in the state shown in FIG. 2C, the state in which the buttons orient upward is stored, and the next screen is displayed in the state in which the buttons orient upward.

In this way, when the next screen is displayed (S312), a timer stored in the timer memory 13b starts counting, and it is judged whether or not the count value of the timer reaches a predetermined time, or whether or not the end button included in the next screen has been touched (S313). Then, if the predetermined time has not elapsed, or the end button has not been touched (S313: No), it is judged whether or not the function button included in the next screen has been touched (S314). If the function button included in the next screen has been touched (S314: Yes), the procedure proceeds to the processing in S312; if the function button has not been touched (S314: No), the procedure proceeds to the processing in S313.

As described above, after the next screen is displayed (S312), the processing in S301 and S306 is not performed. That is, the touched edge portion is not detected, and the display direction of the next screen is not changed according to the touched edge portion. When the next screen is displayed, the next screen is already displayed in a direction which is easily visible to the user, in a direction designated by the user, by the processing in S306 and S310. Thus, in such a case, by omitting the processing in S301 and S306, it is possible to reduce a load required for such processing.

On the other hand, if it is judged in the processing in S313 that the predetermined time has elapsed or the end button has been touched (S313: Yes), the procedure goes back to the processing in S300 again, and the menu screen is displayed. That is, if it is judged in the processing in S313 that the predetermined time has elapsed or the end button has been touched (S313: Yes), it is possible to display the menu screen (the initial screen) automatically or by the user's choice.

As described above, an example of the invention has been described based on the embodiment; however, the present invention is not limited to the embodiment described above. It is to be understood that various modifications and variations are possible within the scope of the invention.

In the embodiment described above, a case where the direction in which the function buttons 30 to 35 are displayed and the display positions of the function buttons 30 to 35 are changed according to the touched edge portion has been described. However, as shown in FIG. 2E, for example, when the finger of the user crosses the left edge portion 16c of the LCD 16 and enters the LCD 16, the function buttons 30 to 35 may be displayed in such a way that only the texts (such as letters, numbers, characters, etc) indicating the contents of the function buttons 30 to 35 orient the left edge portion 16c without changing the display positions of the function buttons 30 to 35. In such a case, since there is no need to store, for each touched edge portion, the display positions in which the function buttons 30 to 35 are displayed, it is possible to save the consumed amount of space in the memory and change the display direction at higher speed than when display is performed by changing the display positions.

Incidentally, the embodiment described above deals with a case in which the display state is switched by using the edge portion of the LCD 16 (the edge portion of the touch panel 17) as an example of the direction selecting portion. However, using a portion located somewhat away from the edge is also effective. The detailed explanation is made with reference to FIGS. 4A and 4B. In FIG. 4A, as the embodiment described above, the edge portion 16c is at the leftmost of the LCD 16 (the touch panel 17). On the other hand, as shown in FIG. 4B, the edge portion 16c can be provided at a position that is apart from the leftmost of the LCD 16 (the touch panel 17) by a distance C. Moreover, the width W of the edge portion 16c can be set arbitrarily so long as the width W can be used for correctly detecting that the object such as the finger of the user has touched the touch panel 17. FIGS. 4A and 4B only show examples of the edge portion 16c. Similarly, the edge portion 16a, 16b and 16d can be provided at a position that is apart from the upmost, the bottommost and the rightmost of the LCD 16 (the touch panel 17) by a predetermined distance.

What is claimed is:
1. A display processing apparatus comprising:
   a display configured to display a first designator to be displayed as a first image, and configured such that, when an object approaches close to or contacts with an arbitrary position on the display, an electrical change occurs at the arbitrary position of the display;
   a display control unit configured to control the display to display the first designator;
   a detection unit configured to determine an inputted position of the display by detecting the electrical change at the arbitrary position of the display;
   a first memory which stores the first image of the first designator, a display position of the first designator, and processing indicated by the first designator, in relation to one another;
   a processing performing unit configured to determine a selected designator based on whether a range of the first designator stored in the first memory and displayed on the display includes the inputted position of the display determined by the detection unit, and configured to perform the processing indicated by the selected designator;
   a judging unit configured to judge whether or not the inputted position determined by the detection unit is included in a direction selecting portion of the display, the direction selecting portion including a plurality of direction selecting ranges each corresponding to a particular display direction of the display, and each of the direction selecting ranges being located at only an edge portion of the display; and a display direction memory storing a first display direction in which the first designator is displayed by the display control unit, wherein, when the judging unit judges that the inputted position determined by the detection unit is included in one of the plurality of direction selecting ranges corresponding to a second display direction different from the first display direction in which the first designator is displayed, the display control unit changes the first display direction of the first designator to the second display direction, and wherein, when the display control unit switches a current screen to a next screen to display on the display, the next screen includes a second designator configured to be displayed as a second image, and the display control unit displays the second designator of the next screen in the second display direction.

2. The display processing apparatus according to claim 1, wherein when the judging unit judges that the inputted position determined by the detection unit is included in the direction selecting portion of the display, the display control unit moves the display position of the first designator in such a way that the first image of the first designator orients the direction selecting portion which includes the inputted position determined by the detection unit.

3. The display processing apparatus according to claim 1, wherein:

the judging unit is further configured to determine which one of the plurality of direction selecting ranges includes the inputted position detected by the detection unit, the display processing apparatus further comprises a second memory which stores a corresponding display position of the first designator and a corresponding image of the first designator for each of the plurality of direction selecting ranges, and the display control unit displays the first designator at the display position, which is stored in the second memory, corresponding to the one of the plurality of direction selecting ranges determined by the judging unit.

4. The display processing apparatus according to claim 3, wherein a direction of the first image of the first designator corresponding to one of the plurality of direction selecting ranges differs from a direction of an image of a designator corresponding to another of the plurality of direction selecting ranges.

5. The display processing apparatus according to claim 1, wherein when the inputted position determined by the detection unit is included in the display position of the first designator, the display control unit performs display prohibition processing which prohibits the first designator from being displayed to orient the inputted position determined by the detection unit.

6. The display processing apparatus according to claim 5, wherein when a predetermined time has elapsed since display of the next screen, the display control unit terminates the display prohibition processing and displays the first designator in the display position of the first designator stored in the first memory.

7. The display processing apparatus according to claim 5, wherein the display control unit displays an end image in the next screen according to the display position stored in the first memory, and when the inputted position determined by the detection unit is included in the display position of the end image, the display control unit terminates the display prohibition processing and displays the first designator at the display position of the first designator stored in the first memory.

8. The display processing apparatus according to claim 1, wherein the second designator of the next screen is different from the first designator included in the current screen.

9. The display processing apparatus according to claim 1, further comprising:

the display having a rectangular shape;

the display control unit configured to control the display to display a plurality of designators;

a touch panel comprising a rectangular-shaped detection area, the rectangular-shaped detection area comprising four edge portions;

the detection unit configured to determine one of the four edge portions, from which an object approaches an input position of the detection area;

the first memory configured to store an image of each of the designators and a display position of each of the designators; and the judging unit configured to judge a display direction based on the one of the four edge portions determined by the detection unit, wherein the display control unit changes a display direction of each of the plurality of designators based on the display direction judged by the judging unit.

10. The display processing apparatus according to claim 9, further comprising:

the display direction memory storing a direction in which each of the plurality of designators is displayed by the display control unit, wherein, when the display control unit switches from a current screen to a next screen displayed on the display, the display control unit displays the next screen in the direction stored in the display direction memory.

11. The display processing apparatus according to claim 10, wherein the next screen comprises another designator different from the designator included in the current screen.

* * * * *